Feb. 16, 1971  V. R. HUEBNER  3,563,872
VOLTAGE GRADIENT CONTROL SYSTEM FOR ELECTROPHORESIS APPARATUS
Filed Aug. 28, 1968  2 Sheets-Sheet 1

INVENTOR.
VICTOR R. HUEBNER
BY
ATTORNEY

United States Patent Office 3,563,872
Patented Feb. 16, 1971

3,563,872
VOLTAGE GRADIENT CONTROL SYSTEM FOR ELECTROPHORESIS APPARATUS
Victor R. Huebner, Fullerton, Calif., assignor to Beckman Instruments, Inc., a corporation of California
Filed Aug. 28, 1968, Ser. No. 756,059
Int. Cl. B01k 5/00
U.S. Cl. 204—180                    14 Claims

ABSTRACT OF THE DISCLOSURE

A system for regulating the magnitude of the electric potential gradient applied across the active electrophoresis area of an electrophoresis apparatus including an electrode disposed on either side of the active area for monitoring the electric potential gradient being applied across the active area, a differential amplifier for comparing the amplitude of a first signal derived by way of the electrodes with a reference signal to provide a second output signal having an amplitude which is a function of the difference between the amplitudes of the first output signal and the reference signal and means responsive to the second output signal for varying the magnitude of the electric potential gradient being applied across the active electrophoresis area.

BACKGROUND OF THE INVENTION

Field of the invention

This invention relates in general to electrophoresis apparatus and more particularly to an electrical feedback system for automatically adjusting the magnitude of the electric potential gradient being applied across the active electropohoresis area of an electrophoresis apparatus to maintain the potential gradient at a predetermined and constant value.

DESCRIPTION OF THE PRIOR ART

Generally speaking, electrophoresis is a method of separating chemically similar substances by virtue of their different migration velocities in the presence of an electrical field. In continuous particle electrophoresis the sample to be separated is injected into a thin film or curtain of electrolyte which continuously flows in an active electrophoresis space or area. Simultaneously, a laterally orientated electrical field is applied across the active space to produce lateral migration of the particles making up the sample being investigated. Among other factors, the amount and velocity of migration is dependent upon the strength of the applied electrical field. Consequently, it is desirable to maintain the eletcrical field gradient applied across the active electrophoresis area at a known and constant value.

In presently available particle electrophoresis apparatus, whether such apparatus takes the form of a continuous flowing film type or a stationary cell type, the electric potential gradient cannot be applied directly across the electrophoresis chamber or active area due to undesirable effects attributable mainly to electrolysis products formed at the electrodes. Several approaches, such as those disclosed in copending U.S. application Ser. No. 481,679 of A. Strickler, filed Aug. 23, 1965, entitled "Electrophoresis Apparatus" now Pat. No. 3,412,008 and copending U.S. application Ser. No. 591,733 of V. Huebner, filed Nov. 4, 1966, and entitled "Continuous Particle Electrophoresis Apparatus Having Improved Particle Band Stability" now Pat. No. 3,458,428 both of which are assigned to the present assignee, have been devised to isolate the electrolysis products formed at the electrodes from the active electrophoresis area. Generally speaking, these approaches contemplate separating the active electrophoresis area from the electrode chambers by means of semipermeable membranes and continuously removing electrolysis products formed at the electrodes by rapidly circulating an electrolyte solution through the electrode chambers.

Undesirable variances in the applied electric potential gradient are caused by changes in the electrolyte conductance of the electrolyte flowing through the active electrophoresis area as well as changes in the electrode polarization potential, the electrolyte conductance of the electrolyte being swept through the electrode chambers, the permeability of the isolation membranes, the concentration of gas bubbles near the electrodes, and local variations in concentration of electrolysis products in the electrode chambers.

In the past it has been the practice to either mathematically correct electrophoretic migration values for variations in the potential gradient as measured by a voltmeter or to manually readjust the power supply setting in accordance with a voltmeter reading in order to maintain a constant voltage gradient. Both of these approaches are cumbersome and time consuming which render them unsatisfactory for long-term preparation type electrophoretic fractionation processes.

SUMMARY OF THE INVENTION

In brief, the present invention contemplates an electrical feedback system for continuously and automatically maintaining the electric potential or voltage gradient being applied across the active electrophoresis area of a continuous particle electrophoresis apparatus at a known and constant value. To this end there is provided an electrode disposed on either side of the active electrophoresis area to monitor the electric potential gradient being applied across the area, a differential amplifier for comparing the applied voltage gradient with a reference voltage and means for regulating the magnitude of voltage being provided by the power supply to maintain the electric potential gradient at a predetermined value. In addition, in accordance with the principles of the present invention, there is provided a variable potentiometer to adjust the predetermined magnitude of the electric potential gradient being applied across the active electrophoresis area.

Accordingly, the primary object of the present invention is to maintain long term stability of electrophoretic migration regardless of variations in line voltage, electrolyte conductance, membrane permeability, electrolysis product formation, or other undesirable variations by automatically maintaining the electric voltage gradient being applied across the active electrophoresis area at a known and constant value.

This and other objects and advantages of the invention will become apparent from the following detailed description when read in conjunction with the accompanying drawing in which:

Figure 2:
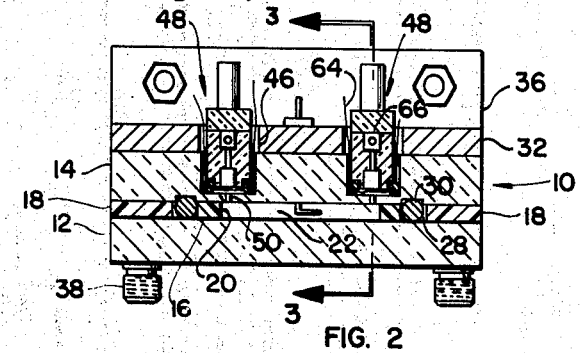
FIG. 2 is a sectional view taken along the plane 2—2 in FIG. 1.
Figure 1:
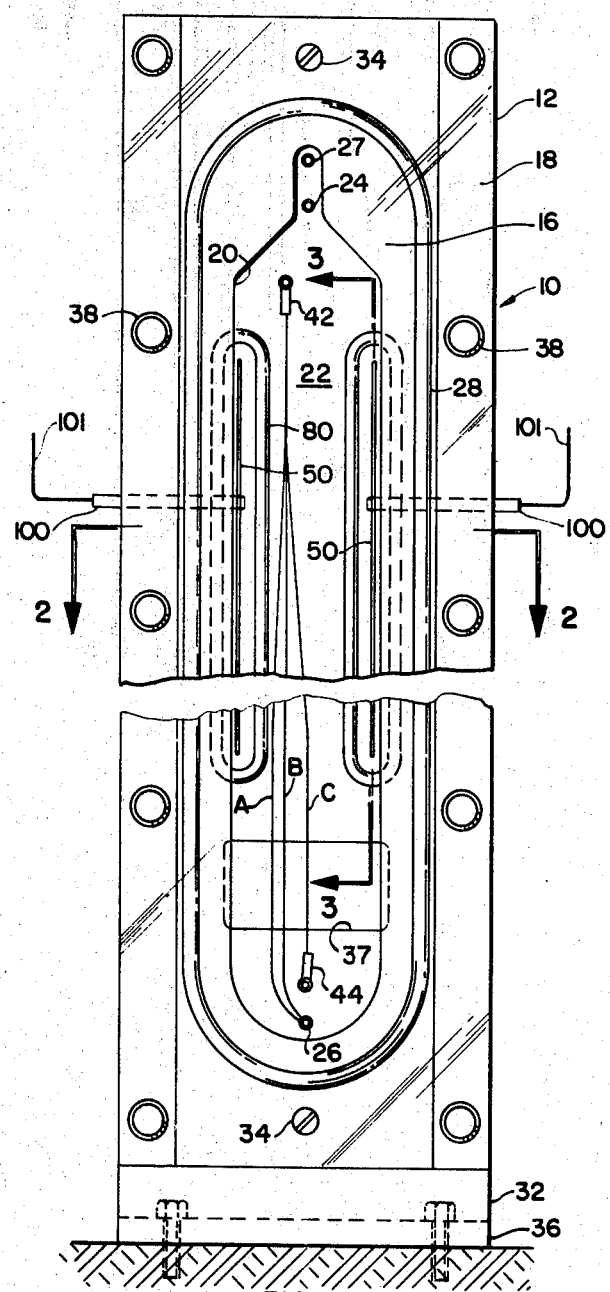
FIG. 1 is a front elevation view of an exemplary embodiment of a continuous particle electrophoresis cell.

Turning now to the drawings, an electrophoresis cell 10 is shown comprising basically a pair of flat, elongated plates 12 and 14 mounted in parallel, spaced-apart relation. The plates 12 and 14 may be fabricated from any rigid, nonconductive, preferably transparent material, for example, clear acrylic plastic such as that sold under the trademark "Lucite." Transparent plates permit both visual observation of the cell in operation and optical scanning of the electrophoresis pattern represented in FIG. 1, for example, by the bands A, B and C.

The spacing between the plates is determined by the thickness of an internal spacer 16 and a pair of external, auxiliary spacer members 18. Spacers 16 and 18 are made of a nonconductive, substantially non-deformable, chemical-resistant material such as the fluorocarbon plastic identified by the trademark "Teflon." By using relatively rigid spacers between the plates 12 and 14, curtain distortions, along the length of cell, are minimized and even after repeated disassembly and reassembly of the cell, curtain thickness will remain the same.

The internal spacer 16 is provided with an elongated opening 20 which, in conjunction with the plates 12 and 14, defines an elongated electrophoresis space 22. By introducing the curtain electrolyte near the upper end of the straight portion of the electrophoresis space, via an electrolyte supply tube 24, a laminar flow curtain, having uniform pressure and velocity distribution across its width, is formed in the parallel-sided portion of the electrophoresis space. The lower end of the space 22 has a semi-circular shape with a curtain removal tube 26 positioned near the lower extremity. In addition to the previously described tubes, an air release tube 27 is provided at the upper extremity of the space 22 to remove any bubbles introduced during operation.

Sealing of the electrophoresis space is accomplished by an O-ring 28 which lies adjacent to the periphery of the spacer 16. A groove 30 is provided in the front surface of the rear plate 14 for retaining the O-ring 28.

To prevent bending of the cell 10 and consequently, distortion of the curtain, the cell is mounted on a rigid backing member 32 running the entire length of the cell. The rear plate 14 is securely attached to the backing member by means of screws 34, for example, which thread directly into the backing member. The lower end of the member 32 extends below the lower extremity of the cell and is provided with a flange 36 for mounting the cell in a vertical position on a suitable surface. An opening 37 is formed in the member 32 to permit the passage of a light beam for optical scanning.

The plates 12 and 14 are clamped together by a plurality of screw fasteners 38 which run along the lateral edges of the cell. The auxiliary spacers 18 prevent the plates from being drawn together at their edges which would affect the electrophoresis space thickness. The screws 38 may be threaded directly into the backing plate 32 and are provided with enlarged, knurled heads to facilitate their rapid removal.

The sample and curtain electrolyte flow systems may be similar to those disclosed in the aforementioned copending application Ser. No. 591,733 of V. R. Huebner, filed Nov. 3, 1966 and assigned to the present assignee. Briefly, sample suspension from a reservoir (not shown) is introduced into the flowing electrolyte curtain through a sample injection tube 42. A laterally positionable tube 44 is provided within the lower portion of the electrophoresis space 22 which is adjustable to intercept any selected portion of the electrophoretic particle band pattern and deliver it to an external vessel. Typically, the sample injection tube 42 will be offset slightly to the left of center to more efficiently utilize the entire curtain width since nearly all particles have negative charges. For samples in which positive particles predominate, the electric field polarity can be reversed.

Figure 3:
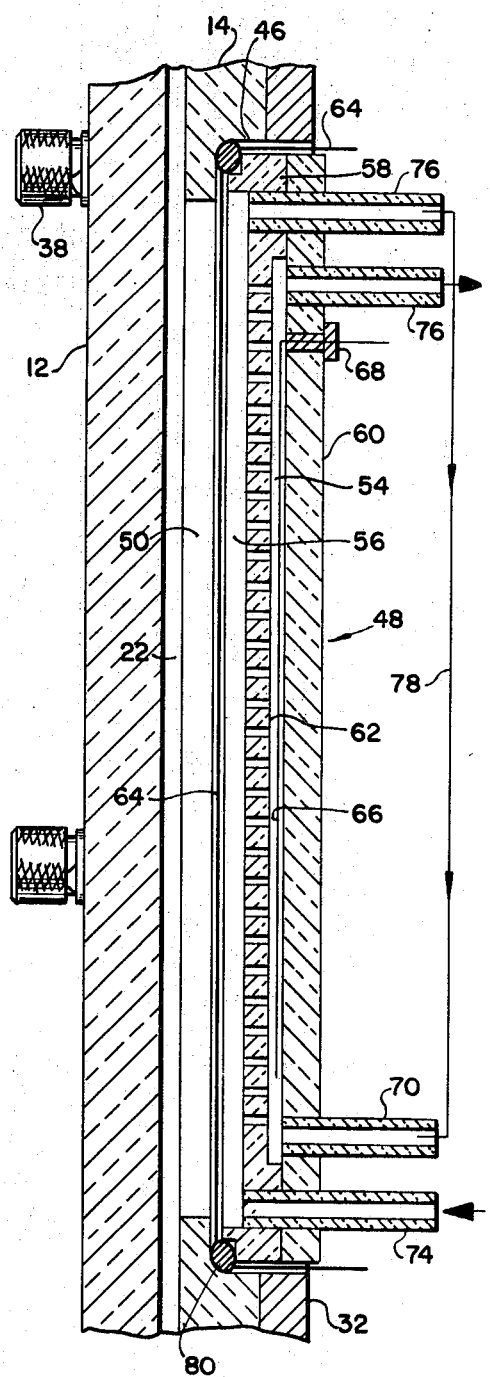
FIG. 3 is a sectional view, in elevation, of a portion of the cell of FIG. 1 taken along the plane 3—3.

Electrode means, best shown in FIG. 3, operatively associated with the electrophoresis space for applying a potential gradient across the curtain will now be described. The rear surface of the rear plate 14 is provided with a pair of elongated recesses 46 for receiving and retaining removable electrode assemblies 48. The recesses 46 communicate with the lateral edges of the electrophoresis space 22 through narrow slots 50 extending along a portion of the parallel section of the electrophoresis space 22.

The electrode assemblies 48 may be constructed in accordance with the disclosure of copending application Ser. No. 591,733, referenced above. Generally, each assembly 48 comprises a housing defining an electrode channel 54 and a bridging channel 56. To facilitate manufacture, the housing may be built up from two pieces designated by the reference numerals 58 and 60. The electrode channel 54 is separated from the bridging channel 56 by a perforated partition 62. Each electrode assembly 48 further includes an ion-permeable membrane 64, which, when the electrode assembly is in place in the rear plate 14, will be sandwiched between the bridging channel 56 and the slot 50 thereby bringing the buffer solution flowing in the bridging channel 56 into ionically-conductive contact with the electrolyte in the slot 50 and the electrophoresis space 22. A wire electrode 66, of platinum or the like, supported by a fitting 68 in the housing element 60, is disposed in each electrode channel 54. A suitable source of D.C. power (not shown) is connected between the electrodes 66, whereby one electrode serves as the anode and the other as the cathode.

A preferred arrangement for flowing buffer solution in the channels 54 and 56 is described in detail in the copending patent application No. 591,733, referenced above. Briefly, each electrode channel 54 is provided with a buffer solution inlet port 70 near the lower end and an outlet port 72 near the top; similarly, each bridging channel 56 has a buffer inlet port 74 adjacent the lower extremity and a buffer outlet port 76 near the top. A bypass conduit, represented schematically by the line 78, connects the bridging channel outlet port 76 with the electrode channel inlet port 70. Buffer solution, introduced into the electrode assembly via the bridging channel inlet port 74 flows upward in the bridging channel 56, a portion exiting at the bridging channel outlet port 76 and the remainder passing through the perforated partition 62 to exit at the electrode channel outlet 72. The crossflow through the partition 62 prevents the migration of ions generated at the electrodes into the electrophoresis space. Uniform curtain pH is thereby maintained.

The electrode assemblies 48 are held in place in the recesses 46 by a suitable clamping means (not shown) which biases the assemblies against the rear plate. Sealing around each assembly is provided by an O-ring 80 retained in a peripheral step formed in the inside face of the housing element 58.

Referring again to FIG. 1, it will be observed that in accordance with the principles of the present invention there is provided an elongated electrode 100 disposed on either side of the active electrophoresis area 22 to monitor the magnitude of the electric potential gradient being applied across the active area 22 by means of electrodes 66. Electrodes 100 are disposed perpendicular to the direction of the flowing film of electrolyte and diametrically opposite to one another. Preferably each electrode 100 extends slightly into the active electrophoresis area. However, the electrodes may be disposed adacent to either side of the electrophoresis active area so long as they remain in electrical contact with the area. Each monitoring electrode 100 is connected to an electrical lead wire 101 which serves to tie the electrodes into the electrical feedback system to be presently described.

Typically, monitoring electrodes 100 are formed of platinum but it should be understood that other suitable materials may be used. Also, although in the illustrated embodiment monitoring electrodes 100 are shown as elongated, it will be appreciated that other geometrical configurations may be used, such as point source electrodes.

Figure 4:
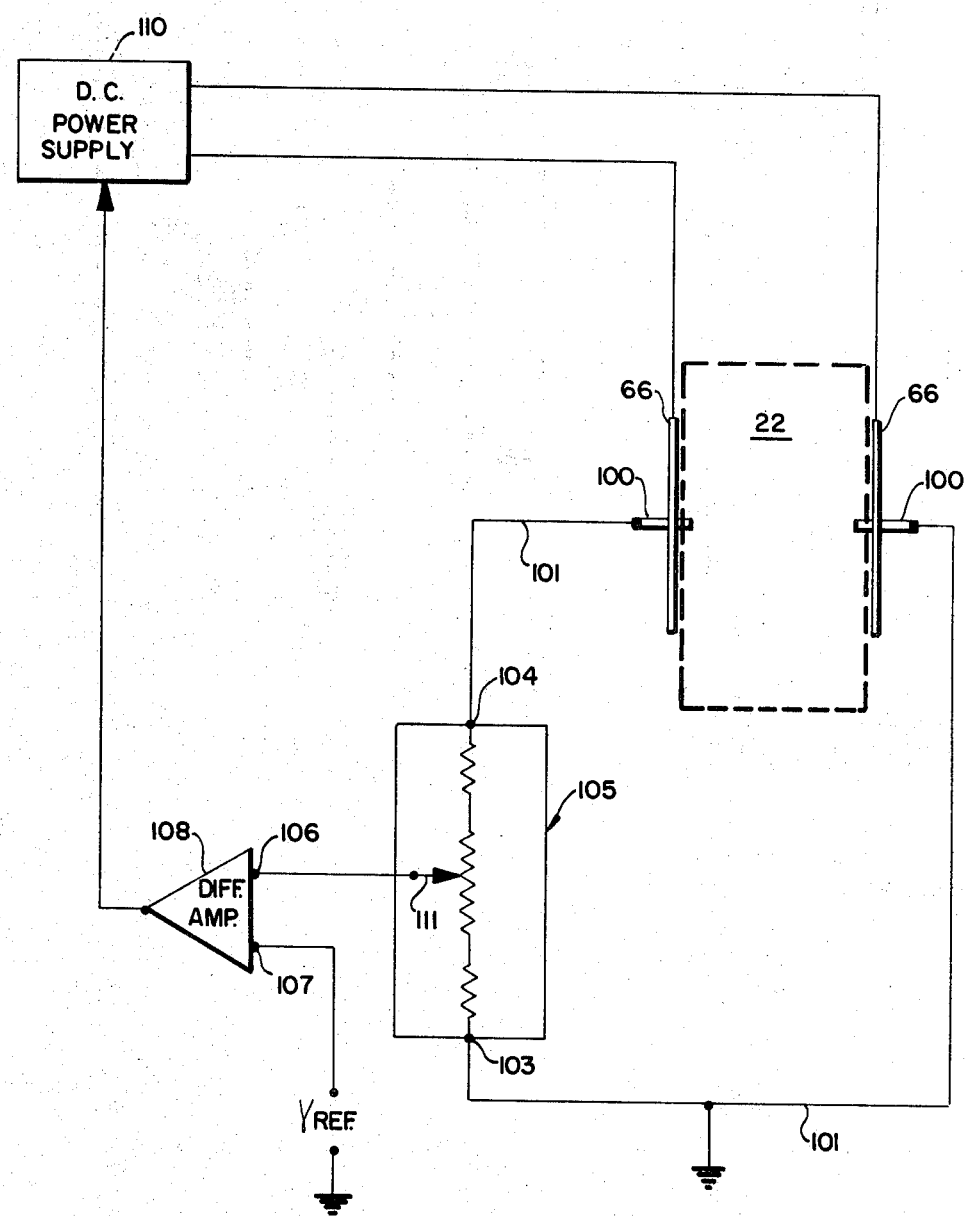
FIG. 4 illustrates in block diagram form the electrical feedback system in accordance with the principles of the present invention.

Referring now to FIG. 4, there is shown in block diagram form the electrical feedback system for automatically maintaining the electric potential gradient being applied across the active electrophoresis area at a known and constant value. In the interest of clarity, the active electrophoresis area 22 has been diagramatically illustrated by a dotted line.

The electric potential gradient is initially applied across the active electrophoresis area 22 by means of a pair of electrodes 66 each of which is connected to a D.C. power supply 110. The magnitude of this applied potential is monitored by electrodes 100 positioned on either side of active electrophoresis area 22. The voltage sensed by electrodes 100 is impressed across input terminals 103 and 104 of a variable potentiometer 105 by way of electrical connections 101. The resistance of variable potentiometer 105 should be relatively large, say around 10,000 ohms or greater, to prevent excessive current flow in the electrode circuit which would promote the formation of undesirable electrolysis products at the monitoring electrodes 100. In practice, the potential developed across monitoring electrodes 100 may be conveniently monitored by means of a voltmeter (not shown) connected across leads 101 and calibrated to permit a direct readout in volts per centimeter.

The D.C. voltage signal appearing at movable arm 111 of potentiometer 105 is applied directly to one input 106 of a differential amplifier 108. A reference voltage ($V_{ref.}$), which is proportional to the magnitude of the desired potential gradient to be applied across the active electrophoresis area 22, is fed directly to the other input terminal 107 of differential amplifier 108. The output of differential amplifier 108 is fed to D.C. power supply 110 to vary the magnitude of the voltage supplied by the power supply 110 and applied across the electrodes 66 until the magnitude of the voltage signals appearing at input terminals 106 and 107 of differential amplifier 108 are equal. In practice, the D.C. power supply output voltage may be automatically varied by connecting a pentode electron tube in series with the output of line of the power supply and connecting the control electrode directly to the output of differential amplifier 108.

In practice, the magnitude of the reference voltage ($V_{ref.}$) is selected so that when movable arm 11 is set at the middle of variable potentiometer 105 the voltage appearing at the movable arm 111 is equal to the reference voltage ($V_{ref.}$). In other words the magnitude of the reference voltage ($V_{ref.}$) is selected so that it is a predetermined fraction of the desired magnitude of the voltage to be applied across active area 22. Such an arrangement enables one to set the initial applied potential across electrophoresis active area 22 at any desired magnitude in the manner to be presently described.

In operation, if the applied potential gradient across active area 22 changes due to a change in any of the aforementioned operating conditions, this potential is sensed by electrodes 100 and impressed across potentiometer 105. Accordingly, any variation in the applied voltage is reflected by a concomittant increase or decrease in the amplitude of the voltage signal appearing at movable arm 111 of variable potentiometer 105. This signal is in turn coupled to differential amplifier 108 wherein it is compared with the amplitude of the reference signal ($V_{ref.}$). Differential amplifier 108 provides an output signal whose amplitude is a function of the difference between the voltage signal derived from variable potentiometer 105 and the reference signal ($V_{ref.}$) which output signal is coupled directly to D.C. power supply 110. D.C. power supply 110 responds to the output signal from differential amplifier 108 to vary the magnitude of the potential applied across active area 22 by way of electrodes 66. This adjustment of the applied potential is, of course, sensed by monitoring electrodes 100 and impressed across the input terminals 103 and 104 of variable potentiometer 105. Thus, the voltage output of D.C. power supply 110 is varied until the amplitude of the voltage signal appearing in movable arm 111 of variable potentiometer 105 is equal to the amplitude of the reference signal ($V_{ref.}$). In this manner, the electrical feedback system of the present invention automatically and continuously adjusts to changing operating conditions of the electrophoresis apparatus to maintain the electrical potential gradient across electrophoresis active area 22 at a known and constant value.

As previously mentioned, by virtue of interposing variable potentiometer 105 between monitoring electrodes 100 and differential amplifier 108 one is able to vary the initial applied potential across active area 22 to any desired value. That is to say, by manually moving movable arm toward input terminal 104 or input terminal 103 the amplitude of the signal appearing in movable arm 111 is increased or decreased. This means that differential amplifier 108 sees a "false" signal at input terminal 106. The difference in amplitude between this false signal appearing at input terminal 106 and the reference signal appearing at terminal 107 is amplified by difference amplifier 108 and fed to D.C. power supply 110 to vary the potential being applied across active area 22 until the voltage appearing at movable arm 111 is equal to the reference voltage ($V_{ref.}$). In this fashion the initial applied potential gradient may be easily set to any desired value.

Numerous modifications and departures from the specific apparatus described herein may be made by those skilled in the art without departing from the inventive concept of the invention. Accordingly, the invention is to be construed as limited only by the spirit and scope of the appended claims.

What is claimed is:

1. In an electrophoresis apparatus, including an area for depositing samples to be electrophoretically separated and means for applying an electric potential gradient across said area, the improvement comprising: means for monitoring the electric potential gradient applied across said area, and means coupled to said monitoring means for regulating the magnitude of the electric potential gradient applied across said area to maintain said electric potential gradient at a predetermined value.

2. An electrophoresis apparatus as defined in claim 1 wherein said regulating means includes means for comparing a first output signal derived from said monitoring means with a reference signal having a predetermined amplitude to provide a second output signal whose amplitude is a function of the difference of the amplitudes between said first output signal and said reference signal, and means responsive to said second output signal for varying the magnitude of the electric potential gradient applied across said area to maintain said electric potential gradient at a predetermined value.

3. An electrophoresis apparatus as defined in claim 2 comprising in addition; a potentiometer interposed between said monitoring means and said comparing means; said potentiometer being variable to adjust the predetermined magnitude of the electric potential gradient voltage to be applied across said area.

4. An electrophoresis apparatus as defined in claim 3 wherein said monitoring means comprises a pair of electrodes disposed on either side of said area diametrically opposite to one another.

5. In a continuous flow electrophoresis apparatus including means defining an area in which samples to be electrophoretically separated are transmitted and means for applying an electric potential gradient across said area and at an angle with respect to the direction of sample flow; the improvement comprising: means for producing a first output signal whose amplitude is a function of the magnitude of the electric potential gradient being applied across said area; means for comparing the first output signal with a reference signal having a predetermined amplitude to provide a second output signal whose amplitude is a function of the difference between the amplitudes of said first output signal and said reference signal, and means responsive to said second output signal for adjusting the magnitude of the electric potential gradient being applied across said area to maintain the electric potential gradient at a predetermined value.

6. In a continuous flow electrophoresis apparatus as defined in claim 5 comprising in addition; a variable potentiometer interposed between said sensing means and said comparing means, said variable potentiometer being adjustable to set the desired electric potential gradient at selected values.

7. In a continuous flow electrophoresis apparatus as defined in claim 5 wherein said sensing means include at least two electrodes located on either side of said area.

8. In a continuous flow electrophoresis apparatus as claimed in claim 7 wherein said electrodes are located across from each other.

9. In a continuous flow electrophoresis apparatus including a pair of substantially flat plates of electrically insulating material, means supporting said plates substantially parallel face-to-face relationship, spacer means for maintaining a separation between said plates and defining an electrophoresis working space therebetween, means for introducing an electrolyte into said working space at a first point, means for injecting into said working space downstream from said first point a sample to be electrophoretically separated, and means for applying an electric potential gradient across said working space, the improvement comprising: means for sensing the magnitude of the electric potential gradient being applied across said working space, and means coupled to said sensing means for adjusting the magnitude of the electric potential gradient being applied across said working space to maintain the electric potential gradient at a predetermined and constant value.

10. In a continuous flow electrophoresis apparatus as defined in claim 9 wherein said varying means include a comparing means for comparing the amplitude of a first signal derived from said sensing means with a reference signal having a predetermined amplitude to produce a second output signal having an amplitude which is a function of the difference between the amplitudes of said first output signal and said reference signal, and means responsive to said second output signal for varying the magnitude of the electric potential gradient being applied across said working space to maintain the electric potential gradient at a predetermined value.

11. In an electrophoresis apparatus as defined in claim 10 comprising in addition a potentiometer interposed between said comparing means and said sensing means.

12. In a continuous flow electrophoresis apparatus as defined in claim 10, wherein said sensing means comprises a pair of electrodes located on either side of said working space.

13. An electrophoresis apparatus as defined in claim 2 wherein said electrodes are elongated and orientated substantially or cognal to the direction of sample flow.

14. A method for automatically maintaining the magnitude of an electric potential gradient across a cell in an electrophoresis system at a predetermined value comprising the steps of: monitoring the electric potential gradient being applied across said cell, and automatically varying the electric potential gradient being applied across said cell to maintain the electric potential gradient at a predetermined value.

References Cited

UNITED STATES PATENTS

| 2,555,487 | 6/1951 | Haugaard et al. | 204—299 |
| 3,085,956 | 4/1963 | Caplan | 204—299 |
| 3,226,556 | 12/1965 | Rosin | 204—180 |

JOHN H. MACK, Primary Examiner

A. C. PRESCOTT, Assistant Examiner

U.S. Cl. X.R.

204—299